Dec. 13, 1960 J. A. F. ROCHE ET AL 2,963,859
TURBOJET FUEL REGULATING SYSTEM WITH TEMPERATURE
COMPENSATION FOR PREVENTING COMPRESSOR STALL
Filed Oct. 26, 1955
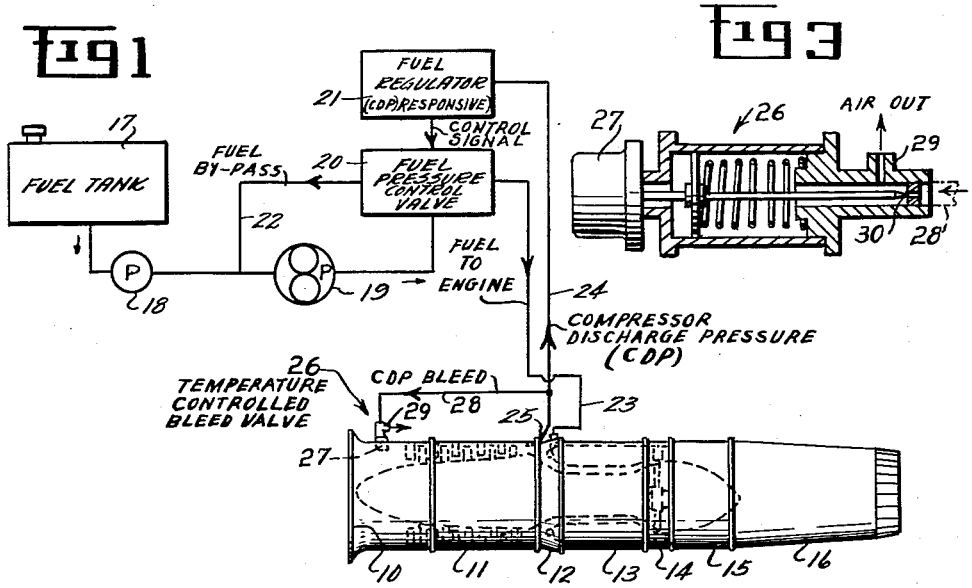
INVENTOR.
ALBERT F. SCHEXNAYDRE
JEAN A. F. ROCHE
BY
Edward M. Tuttle
THEIR ATTORNEY United States Patent Office 2,963,859
Patented Dec. 13, 1960

2,963,859

TURBOJET FUEL REGULATING SYSTEM WITH TEMPERATURE COMPENSATION FOR PREVENTING COMPRESSOR STALL

Jean Alfred Felix Roche, Cincinnati, and Albert Francis Schexnaydre, Madeira, Ohio, assignors to General Electric Company, a corporation of New York Filed Oct. 26, 1955, Ser. No. 542,974

1 Claim. (Cl. 60—39.28)

This invention relates to a fuel regulating system for jet-type engines and, more particularly, to a fuel regulating system incorporating means to prevent stall in such engines.

In fuel regulating systems for a jet-type engine, it is customary practice to schedule the fuel to the engine as a function of several parameters. These parameters usually comprise at least the compressor discharge pressure, the engine speed, the throttle setting, and the barometric pressure or altitude. Since all of these parameters affect efficient engine operation, it is customary to feed these parameters into a device known as a regulator which is used to control a fuel valve to schedule fuel to the engine in accordance with them.

Jet-type engines, especially those that employ axial-flow type compressors, are subject to a phenomenon known as stall or surge within the compressor. This condition varies with different engines depending upon the characteristics of the engine involved. Such a condition results in random and reverse flow of air within the compressor to set up destructive vibration and over temperature unless corrected. If the engine were to operate at the same air temperature and pressure at all times, it would be relatively simple to design a fuel regulating system to prevent the stall. Unfortunately, operational limits of a jet-type engine subject it to extreme variations in temperature and pressure. When stall occurs, fuel scheduled to the engine at that instant is normally higher in quantity than the engine can accommodate, since the back pressure on the compressor is too high and the mass air flow drops. The result is higher temperatures and vibration which may be very damaging to the engine.

Furthermore, engine specifications require the engine to be able to accelerate from one given speed to another within a certain time limit. During this period of acceleration, the engine passes through a critical speed where the danger of stalling within the compressor is present. In other words, the fuel flow scheduled to the engine during acceleration may be excessive and thereby, through increasing the volume of the hot gases which must pass through the turbine diaphragm, may require a higher pressure from the compressor to force the gases through the turbine nozzle diaphragm than the compressor is capable of producing at the existing physical speed. When this occurs, the phenomenon known as stall results. This changes the flow conditions through the compressor to those that are much less favorable and the compressor's ability to sustain a high pressure ratio is further impaired.

Another condition which is not taken into account in scheduling fuel flow to the engine is the temperature of the air entering the compressor. It is well known that, other conditions being equal, the density of air varies inversely as the temperature. Thus, the amount of air pumped under a set of given conditions will vary depending upon the temperature of the air at those conditions. From a practical standpoint, this means that on a cold day or, with cold inlet air typical at high altitudes, a jet-type engine operates closer to the stall line. Since the compressor discharge pressure is at a higher value than normal, both during steady state operation and during acceleration because of the denser air, the regulator calls for an increase in the fuel to the engine. From the standpoint of the engine during acceleration, excessive increase in fuel flow is not desirable. On a warm day, or with high inlet air temperatures typical at low altitudes, the air density is lower and the compressor discharge pressure is lower calling for less fuel than the engine can accommodate and consequently poor acceleration or acceleration to the desired speed may not result. Thus, the engine faces mutually exclusive conditions of operation.

In other words, the proper adjustment of the fuel regulator to avoid stall at low temperature dense air conditions does not give the proper fuel regulation to provide the necessary acceleration fuel flow at high temperature or less dense air conditions. Conversely, the proper adjustment of the fuel regulator for high temperature conditions to provide proper acceleration fuel flow is not satisfactory at the low temperature operating conditions without danger of stalling the engine compressor. Thus, for a jet-type engine, which may change altitude rapidly and encounter extreme temperature variations, and which is also called upon for rapid accelerations without stall, the problem of proper fuel scheduling becomes a very real one.

The main object of the present invention is to provide a conventional fuel regulating system with temperature sensing means to compensate for the effects of pumping air at varying density.

A further object is to provide such a regulating system with a temperature sensitive valve or its equivalent to control the pressure in the line connecting the regulator and the compressor.

Another object is to provide such a regulating system with a temperature sensitive valve or its equivalent which permits the fuel flow schedule to the engine to be more compatible with the fuel flow schedules required under varying compressor inlet temperature conditions and which is applicable at both high and low ambient temperatures.

Briefly stated, in accordance with our invention, we provide the air line that conventionally connects the regulator with the compressor of the engine with a temperature sensitive bleed valve that senses the ambient air or inlet temperature to the compressor and bleeds air from the line as a function of low air temperature to eliminate stalling of the compressor, and ceases to bleed as a function of high air temperature thereby biasing the compressor discharge pressure signal to the fuel regulator.

Our invention will be better understood from the following description taken in connection with the accompanying drawing and its scope will be pointed out in the appended claim.

In the drawing:

Figure 1 is a schematic layout of a fuel regulation system employing the present invention;

Figure 2 is a typical acceleration curve; and

Figure 3 is a part sectional view of a conventional temperature sensitive bleed valve suitable for use in the fuel regulator system of Figure 1.

Referring first to Figure 1, there is shown a conventional jet engine comprising an inlet 10, a compressor section 11, a diffuser 12, combustion chambers 13, a turbine 14, a tailpipe 15, and an afterburner 16. The fuel regulating system, which is normally carried as part of the engine, is shown diagrammatically in Figure 1. It includes a fuel tank 17, a booster pump 18, a fuel pump 19, a fuel pressure control valve 20, and a regulator 21 which may be part of member 20 or separate therefrom as shown. Suitable lines connect the various members as shown. A bypass line 22 is provided to spill the fuel when the pressure level across valve 20 becomes too high.

Fuel pressure control valve 20 is connected by the line 23 to suitable fuel nozzle means in combustion chambers 13. Regulator 21 is connected by a line 24 to the compressor 11 to sense compressor pressure which may be at the compressor outlet 25 as shown. Regulator 21 and valve 20 are well known and preferably are of the construction disclosed in Patents Nos. 2,622,393 to Edwards and 2,695,055 to Cruckshank, respectively, with the regulator connected to actuate the control valve. As fully explained in the aforementioned Edwards patent, the regulator is normally responsive to compressor discharge pressure through line 24, to engine speed, throttle setting, and altitude by other suitable connections to the regulator not shown. The regulator senses these parameters and schedules the valve 20 to admit fuel to the engine in accordance therewith. As previously mentioned, and as fully explained in the Edwards patent just cited, the control normally acts to schedule fuel flow to the engine as a direct function of compressor discharge pressure; that is, an increase in compressor discharge pressure normally acts through the control to schedule increased fuel flow to the engine, and vice versa. Thus far described, the system is a conventional one for the supply of fuel to the jet engine.

Referring next to Figure 2, there is shown a typical acceleration curve for a jet engine. Slight deviations from the solid line are permitted for acceptable operation. The fuel control system described above is designed to schedule fuel to the engine in accordance with the parameters given above. Because the regulator does not sense temperature, it cannot correct for change in air density. If the air temperature is lowered, the regulator may schedule fuel faster than the engine is able to consume it under safe acceleration conditions, as previously described. This condition will occur when the regulator has been adjusted to provide the proper acceleration under high temperature inlet air conditions. However, such regulator adjustment is unsatisfactory for the low temperature air conditions if stall is to be avoided. This situation is shown by line $f$—$e$—$d$ in Figure 2. Conversely, if the regulator is adjusted so that no stall will occur on cold days, then acceleration on hot days is extremely slow. This situation is shown by curve $a$—$b$—$c$ on Figure 2. The desirable schedule will permit rapid acceleration on hot days or high inlet air temperature and will compensate for the stall problem on cold days or low inlet air temperature. This may be done by properly adjusting the compressor discharge pressure sensed by the regulator. The present invention proposes to do this by the use of a temperature responsive bleed valve inserted in the line 24 connecting the regulator with the compressor discharge pressure. Such a valve operates to change the pressure sensed by the regulator in order to permit the engine to respond according to the solid line shown in Figure 2.

In further explanation of Figure 2, curve $f$—$e$—$d$ is the curve the engine would follow if no bleed occurs and if the engine regulator is adjusted to provide acceleration times indicated by the portion of the curve designated $e$—$d$ which is satisfactory acceleration for high temperature air conditions. Curve portion $f$—$e$ indicates a region where stall may occur with this fuel schedule. Curve $a$—$b$—$c$ is the curve the engine would follow if no bleed occurs and if the regulator is adjusted to provide acceleration times indicated by the portion of the curve designated $a$—$b$, that is, if the regulator is adjusted to prevent stall at low temperature air conditions. Curved portion $b$—$c$ indicates a region where intolerably slow engine accelerations occur with this fuel schedule. By properly bleeding the compressor discharge line to modify the pressure sensed by the regulator, it is possible to follow the curve $a$—$b$—$e$—$d$ which is the desired curve and avoid the stall problem at low temperature air inlet conditions and the slow acceleration problem at high temperature air inlet conditions. By bleeding the air over the curve portion $a$—$b$, the fuel schedule is reduced and the stall problem is obviated. By reducing the air bleeding over the curve $d$—$e$ to provide a modulated bleed, the proper engine response is insured over its widest operating air temperature range, and by not bleeding any air along the curve $e$—$d$ the proper fuel is scheduled to the engine by the regulator to permit proper acceleration under the high temperature air conditions.

In order to compensate the regulator to sense the proper pressure with a change in temperature and thus to permit the engine to accelerate along curve $a$—$b$—$e$—$d$ we provide a temperature responsive valve generally indicated at 26, connected into the line 24. This valve is designated to provide a predetermined bleed schedule as a function of the compressor inlet air temperature and contains a temperature sensitive element 27 which preferably is located adjacent to the inlet 10 of the engine, as shown, in order that it may sense the inlet air temperature to the compressor. Valve 26 may have any well-known internal structure such as shown by way of example in Figure 3, wherein valve elements 30 meter fluid in response to actuation by a temperature sensitive element 27. The particular construction of the valve forms no part of the present invention. Valve 26 has a connection 28 with the compressor pressure line 24 so that line 24 may bleed through valve outlet 29 in response to the operation of the internal mechanism of the valve by element 27. It is to be understood that the amount of air bled through outlet 29 varies as a function of the temperature sensed by element 27. In other words, the internal structure of the valve performs an automatic metering function as determined by element 27 bleeding more on a cold day than a hot day.

In operation, as the engine is subjected to changes in the ambient air temperature, the pressure in line 24 sensed by regulator 21 is too high or too low for efficient engine operation because the effect of air density change is ignored. Consequently, the fuel supply to the engine by valve 20 under the control of regulator 21, is too high, or too low. The use of the temperature responsive valve 26 in line 24 senses the temperature change of the air and bleeds air from line 24 as a function of the temperature so that regulator 21 receives a corrected pressure indication from line 24. As a result, the regulation of valve 20 is modified to include the temperature of the ambient air and therefore the density, which modification results in the proper fuel being scheduled to the engine nozzle to avoid stall in the compressor with cold inlet air and permit rapid acceleration with hot inlet air.

While a particular embodiment of the invention has been illustrated and described, it will be obvious to those skilled in the art that various changes and modifications may be made without departing from the invention and it is intended to cover in the appended claim all such changes and modifications that come within the true spirit and scope of the invention.

What we claim as new and desire to secure by Letters Patent is:

A fuel regulating system for use with a jet type engine having an air compressor susceptible to stall and fuel supply means for the engine, comprising a fuel regulator including fluid pressure sensitive means connected to control said fuel supply means and normally operative to schedule fuel flow to the engine from said supply means as a direct function of the fluid pressure sensed, pressure communication means connecting compressor discharge pressure to said regulator fluid pressure sensitive means, and compressor air inlet temperature responsive valve means interposed in said pressure communication means to bleed fluid pressure therefrom with the rate of bleed being inversely related to inlet air temperature and at a bleed rate to avoid compression stall.

References Cited in the file of this patent

UNITED STATES PATENTS

| | | |
|---|---|---|
| 2,422,808 | Stokes | June 24, 1947 |
| 2,658,566 | Wirth et al. | Nov. 10, 1953 |
| 2,750,734 | Anxionnaz et al. | June 19, 1956 |
| 2,775,231 | Silver | Dec. 25, 1956 |
| 2,778,350 | Reggio | Jan. 22, 1957 |

FOREIGN PATENTS

| | | |
|---|---|---|
| 1,062,072 | France | Dec. 2, 1953 |
| 646,780 | Great Britain | Nov. 29, 1950 |